US008660214B1

(12) United States Patent  
Huynh

(10) Patent No.: US 8,660,214 B1  
(45) Date of Patent: Feb. 25, 2014

(54) QUADRATURE BANDPASS-SAMPLING OFDM RECEIVER

(71) Applicant: Phuong Thu-Minh Huynh, Fairfax, VA (US)

(72) Inventor: Phuong Thu-Minh Huynh, Fairfax, VA (US)

( * ) Notice: Subject to any disclaimer, the term of this patent is extended or adjusted under 35 U.S.C. 154(b) by 0 days.

(21) Appl. No.: 13/709,033

(22) Filed: Dec. 9, 2012

(51) Int. Cl.
*H04L 27/00* (2006.01)

(52) U.S. Cl.
USPC .......................................................... 375/324

(58) Field of Classification Search
CPC ................................... H04L 27/3881
USPC .......................................................... 375/324
See application file for complete search history.

(56) References Cited

U.S. PATENT DOCUMENTS

| | | | | |
|---|---|---|---|---|
| 5,694,389 | A * | 12/1997 | Seki et al. ..................... | 370/208 |
| 5,732,113 | A * | 3/1998 | Schmidl et al. ............... | 375/355 |
| 5,841,388 | A * | 11/1998 | Yasuda et al. ................. | 341/155 |
| 6,275,540 | B1 * | 8/2001 | Barrett et al. ................. | 375/316 |
| 7,098,967 | B2 * | 8/2006 | Kanno et al. .................. | 348/726 |
| 7,697,620 | B2 * | 4/2010 | Kroeger et al. ............... | 375/260 |
| 8,180,470 | B2 * | 5/2012 | Pahuja ............................ | 700/94 |
| 2004/0242177 | A1 * | 12/2004 | Yang ......................... | 455/234.1 |
| 2005/0259186 | A1 * | 11/2005 | Mehr et al. .................... | 348/731 |
| 2006/0007929 | A1 * | 1/2006 | Desai et al. ................... | 370/389 |
| 2006/0120267 | A1 * | 6/2006 | De Bart et al. ................ | 370/208 |
| 2006/0198474 | A1 * | 9/2006 | Sorrells et al. ................ | 375/343 |
| 2008/0025437 | A1 * | 1/2008 | Huynh .......................... | 375/324 |
| 2009/0185545 | A1 * | 7/2009 | Tarighat-Mehrabani et al. ............................ | 370/343 |
| 2009/0190701 | A1 * | 7/2009 | Nekhamkin et al. .......... | 375/355 |
| 2010/0159858 | A1 * | 6/2010 | Dent et al. .................... | 455/131 |

* cited by examiner

*Primary Examiner* — Juan A Torres
(74) *Attorney, Agent, or Firm* — Phuong Huynh

(57) ABSTRACT

A quadrature bandpass-sampling receiver for an orthogonal frequency division multiplexing (OFDM) receiver is provided. A transmitted OFDM signal is received by a low-noise amplifier, has its image frequency removed by a subsequent image reject filter, and is frequency-translated to an intermediate frequency by a mixer. A quadrature bandpass-sampling delta-sigma analog-to-digital demodulator (QBS-ADD) down-converts the frequency-translated OFDM signal to baseband based on a high-frequency sampling clock equal to the intermediate frequency, and generates in-phase and quadrature outputs in the form of high-frequency bit streams. The bit streams are fed to a Discrete Fourier Transform (DFT) engine, which generates in-phase and quadrature Fourier components.

10 Claims, 10 Drawing Sheets

QUADRATURE BANDPASS-SAMPLING OFDM RECEIVER

FIELD OF THE INVENTION

The present invention relates to an orthogonal frequency division multiplexing (OFDM)-based receiver, bandpass-sampling architecture, and generation of in-phase and quadrature Fourier components using the discrete Fourier transform (DFT) algorithm.

BACKGROUND OF THE INVENTION

The orthogonal frequency division multiplexing (OFDM) scheme is a well-known, high-speed data transmission scheme for next-generation communication technologies. In a conventional OFDM receiver, after a received signal is demodulated to baseband and converted to the digital domain by analog-to-digital converters, its in-phase and quadrature signals are fed to a Fast Fourier Transform (FFT) engine, which computes the in-phase and quadrature Fourier coefficients for further signal processing. The FFT algorithm is well known to minimize the computational resources in generating the Fourier coefficients from a Discrete Fourier Transform (DFT), and many efficient FFT algorithms are widely used in OFDM receivers.

However, multipliers are required in FFT algorithms and their number grows according to N log N, where N denotes the number of input sample points or output Fourier coefficients. As demand for higher data rates and bandwidths in mobile communications has grows, complexity of the FFT processor must also increase to cope with a larger number of OFDM channels.

In light of the short comings in the FFT algorithm processing complexity, a novel OFDM-based receiver, which requires no multiplication when computing the Fourier coefficients, is described herein. This receiver is based on the bandpass sampling technique combined with delta-sigma modulation to demodulate and digitize an RF signal to baseband in a form of high-sampling rate bit streams. The down-converted in-phase and quadrature output signals are clocked at a high sampling rate, comparable to the carrier frequency that modulates the RF signal, and the in-phase and quadrature outputs are bi-level digital signals, having values of 1 or −1. The bi-level digital signals can be fed to the DFT processor, in which the complex exponents, commonly referred to as 'the twiddle factors' can be either added to or subtracted from an accumulator depending on the instantaneous value of the input digital signals, 1 or −1, respectively. As a result, no multiplication is required in this OFDM receiver, thereby improving the DFT resource complexity and processing latency as addition and subtraction are processed faster than multiplication.

SUMMARY OF THE INVENTION

The invention features a circuit for receiving an OFDM signal and generating a plurality of in-phase and quadrature complex Fourier coefficients comprising: an antenna configured to capture and produce an OFDM signal a low noise amplifier (LNA) configured to receive the OFDM signal and generate an amplified OFDM signal; a filter configured to remove an OFDM image signal from the amplified OFDM signal to generate a filtered OFDM signal; a local oscillator configured to generate a local oscillator clock signal having a local oscillator frequency, the local oscillator clock frequency being equal to a difference between an intermediate frequency and an OFDM frequency of the OFDM signal; a mixer configured to frequency-shift the filtered OFDM signal to the intermediate frequency based on the local oscillator clock signal to generate a frequency-shifted OFDM signal; a sampling clock generator configured to generate an in-phase sampling clock signal having an in-phase sampling frequency, generate a quadrature sampling clock signal having a quadrature sampling frequency, the quadrature sampling clock signal being ninety degree out of phase with the in-phase sampling clock signal, the quadrature sampling frequency being equal to the in-phase sampling frequency; a quadrature bandpass-sampling delta-sigma analog-to-digital demodulator (QBS-ADD) configured to demodulate the frequency-shifted OFDM signal from the intermediated frequency down to baseband, based on the in-phase sampling clock signal, to generate an in-phase signal, and demodulate the frequency-shifted OFDM signal from the intermediated frequency down to baseband, based on the quadrature sampling clock signal, to generate a quadrature signal; a cyclic prefix removal circuit configured to receive the in-phase signal based on the in-phase sampling clock signal, receive the quadrature signal based on the in-phase sampling clock signal, generate a reduced in-phase signal based on the in-phase signal, and generate a reduced quadrature signal based on the quadrature signal; a clock divider configured to generate a divide-by-M clock signal having a divide-by-M frequency, based on the in-phase sampling clock signal, the divide-by-M frequency being equal to the in-phase sampling frequency divided by M, and generate a divide-by-N clock, having a divide-by-N frequency, based on the in-phase sampling clock signal, the divide-by-N clock frequency being equal to the in-phase sampling frequency divided by N; a serial-to-parallel converter configured to de-serialize the reduced in-phase signal based on the in-phase sampling clock signal to generate a set of M parallel in-phase bits at the divide-by-M frequency, and de-serialize the reduced quadrature signal based on the in-phase sampling clock to generate a set of M parallel quadrature bits at the divide-by-M frequency; and a plurality of discrete Fourier transform (DFT) circuits, each configured to receive the M in-phase bits and the M quadrature bits, and generate an in-phase complex Fourier coefficient and a quadrature complex Fourier coefficient based at the divide-by-N frequency.

Furthermore, the discrete Fourier transform circuit comprises: a COS/SIN generator configured to generate first through $M^{th}$ first twiddle factors, first through $M^{th}$ second twiddle factors; a quadrature sign combiner configured to receive first through $M^{th}$ quadrature bits, first through $M^{th}$ in-phase bits, first through $M^{th}$ first twiddle factors, and first through $M^{th}$ second twiddle factors, to generate first through $M^{th}$ quadrature complex Fourier signals, the $i^{th}$ quadrature complex Fourier signal corresponding to a first combination of the $i^{th}$ first twiddle factor and the $i^{th}$ second twiddle factor based on the $i^{th}$ quadrature bit and the $i^{th}$ in-phase bit; an in-phase sign combiner configured to receive first through $M^{th}$ quadrature bits, first through $M^{th}$ in-phase bits, first through $M^{th}$ first twiddle factors, first through $M^{th}$ second twiddle factors, to generate first through $M^{th}$ in-phase complex Fourier signals, the $i^{th}$ in-phase complex Fourier signal corresponding to a second combination of the $i^{th}$ first twiddle factor and the $i^{th}$ second twiddle factor based on the $i^{th}$ quadrature bit and the $i^{th}$ in-phase bit; a first accumulator configured to accumulate all M quadrature complex Fourier signals, and generate a quadrature complex Fourier coefficient based at the divide-by-N frequency; a second accumulator configured to accumulate all M in-phase complex Fourier signals, and generate an in-phase complex Fourier coefficient based at the divide-by-N frequency; wherein the first accumulator is reset to a zero value based at the divided-by-N frequency; and the second accumulator is reset to a zero value based at the divided-by-N frequency; wherein M is an integer between 2 and 100 and M is a sub-multiple of N; wherein N is a positive integer, and N is equal to the intermediate frequency divided by the OFDM sub-carrier spacing; wherein a number of in-phase and quadrature complex Fourier coefficients is equal to a number of OFDM sub-carriers in the OFDM signal, and the number of received OFDM sub-carriers is an order of magnitude to three orders of magnitude smaller than N.

The invention also features a method for receiving an OFDM signal and generating a plurality of in-phase and quadrature complex Fourier coefficients comprising: receiving the OFDM signal through the air from the antenna; amplifying the OFDM signal to generate an amplified OFDM signal; filtering the amplified OFDM signal to remove an OFDM image signal from the amplified OFDM signal to generate a filtered OFDM signal; receiving a local oscillator clock signal having a local oscillator frequency, the local oscillator clock frequency being equal to a difference between an intermediate frequency and an OFDM frequency of the OFDM signal; mixing the filtered OFDM signal with the local oscillator clock signal to frequency-shift the filtered OFDM signal to an intermediate frequency to generate a frequency-shifted OFDM signal; generating an in-phase sampling clock having an in-phase sampling frequency; generating a quadrature sampling clock having a quadrature sampling frequency, the quadrature sampling clock being ninety degree out of phase with the in-phase sampling clock, the quadrature sampling frequency being equal to the in-phase sampling frequency; sampling the frequency-shifted OFDM signal using the in-phase sampling clock signal to generate a sampled in-phase signal that is down-converted to baseband; sampling the frequency-shifted OFDM signal using the quadrature sampling clock signal to generate a sampled quadrature signal that is down-converted to baseband; generating a divide-by-M clock signal, having a divide-by-M frequency, based on the in-phase sampling clock signal, the divide-by-M frequency being equal to the in-phase sampling frequency divided by M; and generating a divide-by-N clock signal, having a divide-by-N frequency, based on the in-phase sampling clock signal, the divide-by-N frequency being equal to the in-phase sampling frequency divided by N; wherein the operation of generating a plurality of in-phase complex Fourier coefficients and a plurality of quadrature complex Fourier coefficients comprises: generating a reduced in-phase signal by removing a cyclic prefix in the sampled in-phase signal based on the in-phase sampling clock signal; generating a reduced quadrature signal by removing a cyclic prefix in the sampled quadrature signal based on the in-phase sampling clock signal; generating an M-bit in-phase signal from the reduced in-phase signal based on the divide-by-M clock signal; generating an M-bit quadrature signal from the reduced quadrature signal based on the divide-by-M clock signal; generating the plurality of in-phase complex Fourier coefficients using the discrete Fourier transform on both the M-bit in-phase signal and the M-bit quadrature signal based on the divide-by-N clock signal; and generating a plurality of quadrature complex Fourier coefficients using the discrete Fourier transform on both the M-bit in-phase signal and the M-bit quadrature signal based on the divide-by-N clock signal.

Furthermore, in the above method, the operation of generating an in-phase complex Fourier coefficient and a quadrature complex Fourier coefficient using the discrete Fourier transform further comprises: generating first through $M^{th}$ first twiddle factors, generating first through $M^{th}$ second twiddle factors; receiving first through $M^{th}$ quadrature bits, first through $M^{th}$ in-phase bits, first through $M^{th}$ first twiddle factors, and first through $M^{th}$ second twiddle factors, to generate first through $M^{th}$ quadrature complex Fourier signals, the $i^{th}$ quadrature complex Fourier signal corresponding to a first combination of the $i^{th}$ first twiddle factor and the $i^{th}$ second twiddle factor based on the $i^{th}$ quadrature bit and the $i^{th}$ in-phase bit; receiving first through $M^{th}$ quadrature bits, first through $M^{th}$ in-phase bits, first through $M^{th}$ first twiddle factors, first through $M^{th}$ second twiddle factors, to generate first through $M^{th}$ in-phase complex Fourier signals, the $i^{th}$ in-phase complex Fourier signal corresponding to a second combination of the $i^{th}$ first twiddle factor and the $i^{th}$ second twiddle factor based on the $i^{th}$ quadrature bit and the $i^{th}$ in-phase bit; accumulating all M quadrature complex Fourier signals, and generating a quadrature complex Fourier coefficient based at the divide-by-N frequency; accumulating all M in-phase complex Fourier signals, and generating an in-phase complex Fourier coefficient based at the divide-by-N frequency; wherein the value from the accumulating of all M quadrature complex Fourier signals is reset to zero based at the divided-by-N frequency; and the value from the accumulating of all M in-phase complex Fourier signals is reset to zero based at the divided-by-N frequency; wherein M is an integer between 2 and 100, and M is a sub-multiple of N; wherein N is a positive integer, and N is equal to the intermediate frequency divided by the OFDM sub-carrier spacing; wherein a number of in-phase and quadrature complex Fourier coefficients is equal to a number of OFDM sub-carriers in the OFDM signal, and the number of received OFDM sub-carriers is an order of magnitude to three orders of magnitude smaller than N.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

In overview, the present disclosure concerns electronic devices or units, some of which are referred to as communication units, such as cellular phone or two-way radios and the like, typically having a capability for rapidly handling data, such as can be associated with a communication system such as an Enterprise Network, a cellular Radio Access Network, or the like. More particularly, various inventive concepts and principles are embodied in circuits, and methods therein for receiving signals in connection with a communication unit.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with in integrated circuits (ICs), such as a digital signal processor or application specific ICs. It is expected that one of ordinary skill, notwithstanding possibly significant effort and many design choices motivated by, for example, available time, current technology, and economic considerations, when guided by the concepts and principles disclosed herein will be readily capable of generating ICs with minimal experimentation. Therefore, in the interest of brevity and minimization of any risk of obscuring the principles and concepts according to the present invention, further discussion of such ICs, if any, will be limited to the essentials with respect to the principles and concepts used by the exemplary embodiments.

Figure 1A:
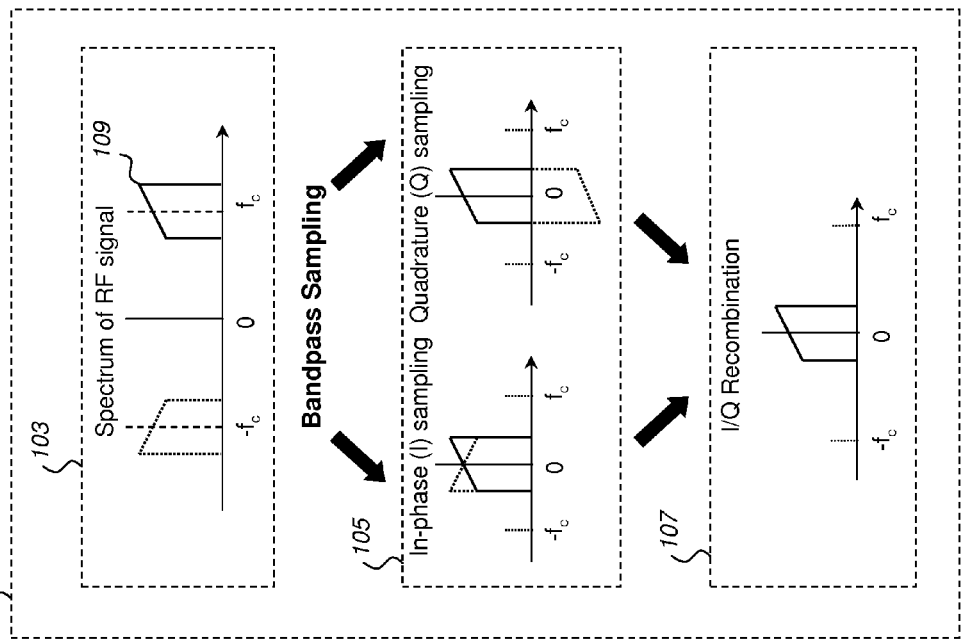
FIGS. 1A and 1B are frequency and timing diagrams illustrating down-conversion to baseband based on the bandpass-sampling theory.
Figure 1B:
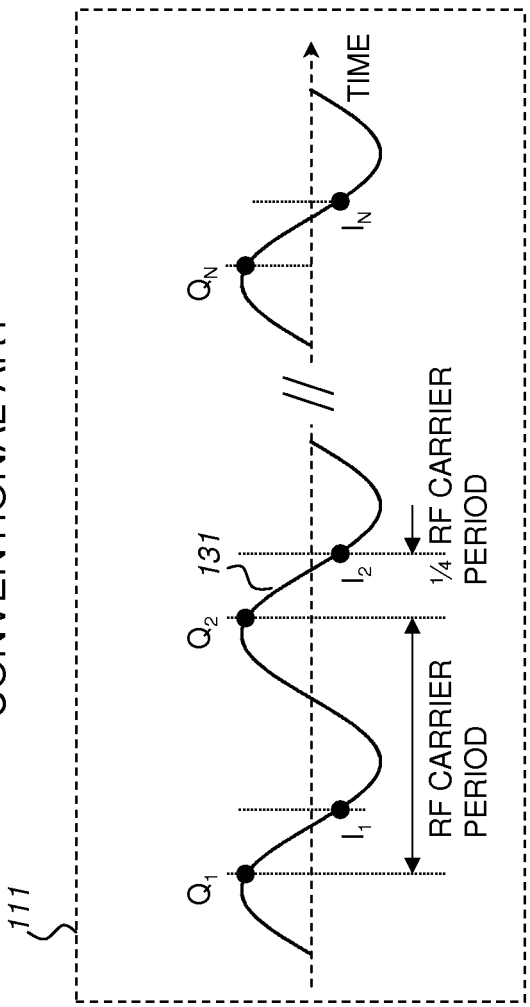

FIG. 1A is a frequency diagram 101 illustrating down-conversion of an RF signal to the baseband frequency based on the bandpass-sampling theory; and FIG. 1B is a timing diagram 111 likewise illustrating down-conversion of an RF signal to the baseband frequency based on the bandpass-sampling theory. A communication transmitter is employed to modulate the information to a carrier frequency $f_C$ and transmit the RF signal over the air. For example, conventional cellular phone carrier frequencies are currently set at either 900 MHz or 1800 MHz. In the frequency domain, the transmitted information in the frequency diagram 103 can be seen centered at the carrier frequency $f_C$, where the width of the shaped object corresponds to the bandwidth of the transmitted information. Note that the transmitted object is mirrored into the negative frequencies along the zero-frequency axis.

The timing diagram 111 illustrates a sinusoidal waveform 131 at the RF carrier frequency. The in-phase and quadrature signals, which carry the communicating information, slowly modulate the amplitude and/or the phase of the sinusoidal waveform 131, depending on the modulation scheme employed in the communication system. In a quadrature bandpass-sampling receiver, the sampling rate is set equal to the RF carrier frequency $f_C$, and only two respective sampled data points for every period of the RF carrier are provided, as shown in the timing diagram 111. The first sequence of sampled data points $I_1, I_2, \ldots, I_N$ corresponds to the in-phase (I) sequence while the second sequence of sampled data points $Q_1, Q_2, \ldots, Q_N$ corresponds to the quadrature (Q) sequence. Note that the time duration in between adjacent sampled points of each sequence is always, $$\frac{1}{f_C},$$

the RF carrier period, and the time duration between a Q sampled point and an adjacent I sampled point is always, $$\frac{1}{4f_C},$$

or one quarter of the RF carrier period.

Bandpass sampling the sinusoidal waveform 131 removes the high frequency RF waveform and retains only the slowly-varying amplitude and/or phase of the communicating information that were modulated to the RF carrier. By virtue of the bandpass sampling theory, the in-phase and quadrature modulated signals are down-converted to baseband, or DC, as illustrated in the frequency diagram 105 of FIG. 1A. The sampled I and Q sequences can be recombined to re-construct the transmitted in-phase and quadrature signals as shown in the frequency diagram 107.

Figure 2A:
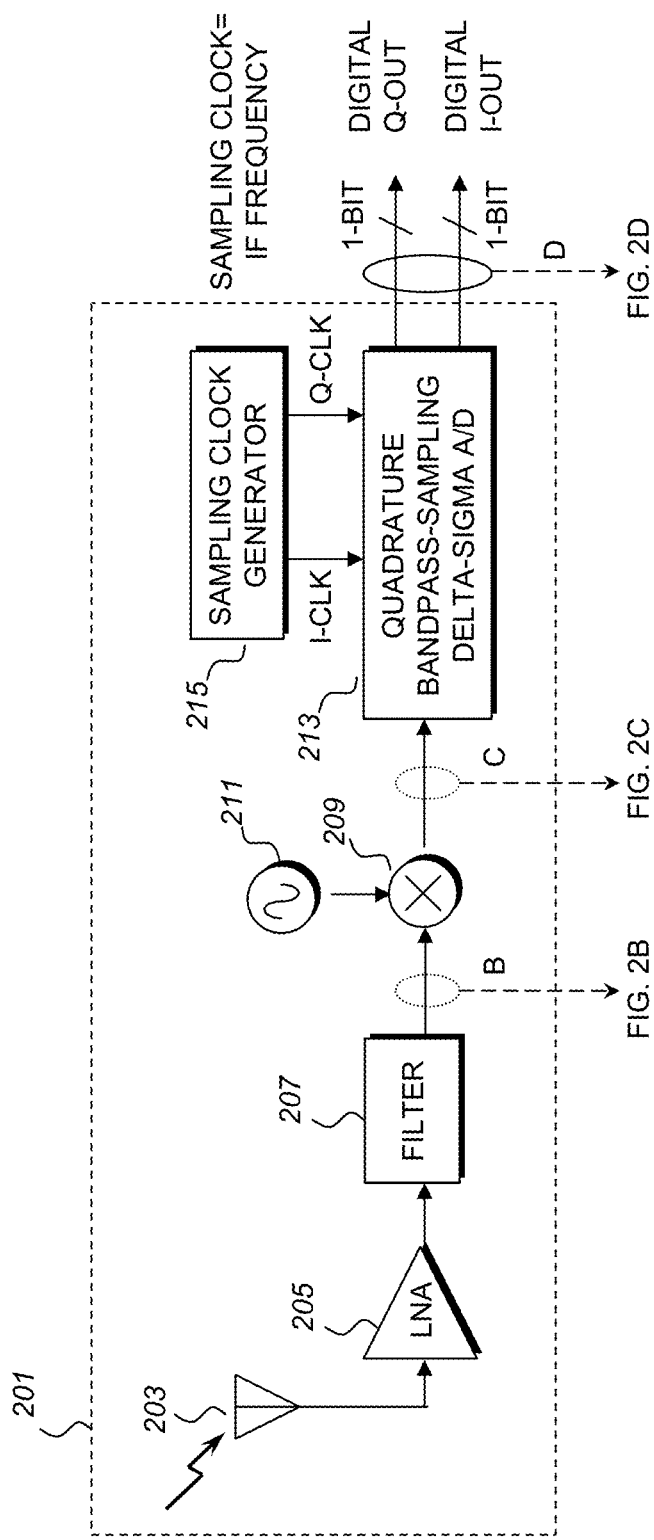
FIG. 2A is a schematic diagram illustrating a quadrature bandpass-sampling RF receiver, according to disclosed embodiments.
Figure 2B:
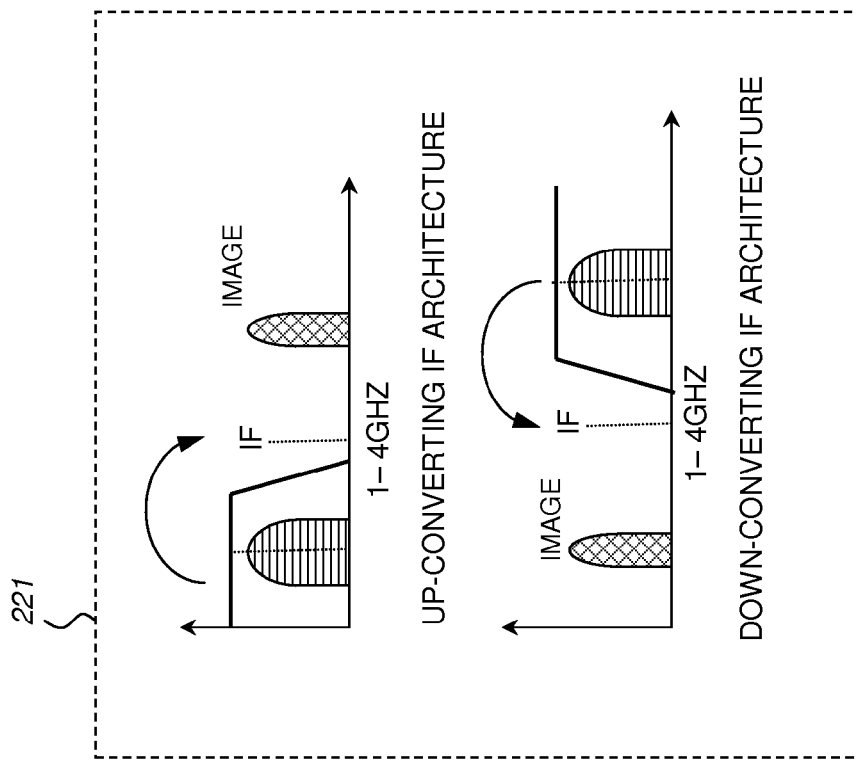
FIGS. 2B-2D are graphs illustrating signals at various points in the receiver of FIG. 2A, according to disclosed embodiments.
Figure 2C:
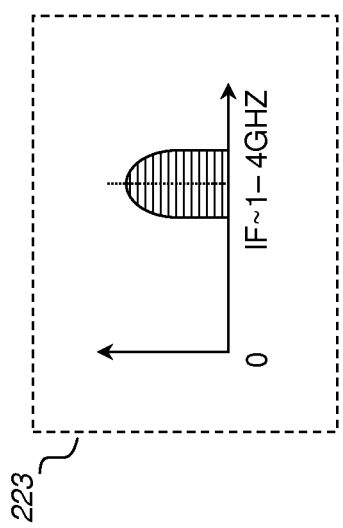
Figure 2D:
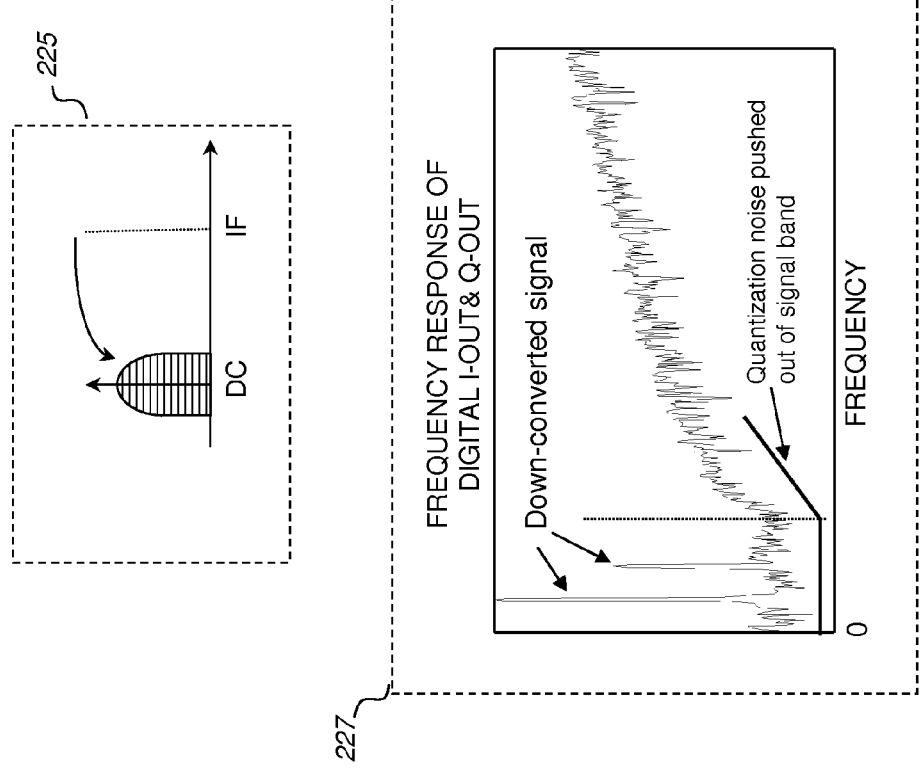

FIG. 2A is a schematic diagram illustrating a conventional wide band quadrature bandpass-sampling receiver 201, which comprises an antenna 203, a low-noise amplifier (LNA) 205, an image-reject filter 207, a mixer 209, a local oscillator 211, a sampling clock generator 215, and a quadrature bandpass-sampling delta-sigma analog-to-digital demodulator (QBS-ADD) 213. FIGS. 2B-2C show frequency diagrams 221, 223, 225, and 227 that illustrate the frequency shifting and demodulation of the RF signal at various stages in the receiver. These stages are marked as B, C, and D on the schematic diagram of FIG. 2A.

The RF signal received at the antenna 203 is amplified by the LNA 205 and processed through the filter 207. The purpose of the image-reject filter 207 is to remove the image of the RF signal before frequency-shifting the RF signal to the intermediate frequency (IF), which is usually set between 1 GHz to 4 GHz. The filter 207 can be a low-pass filter or a high-pass filter, depending upon the implementation. As shown in the frequency diagram 221, for an up-converting IF architecture, the RF signal is located below the IF frequency, and so, a low-pass filter 207 is used to remove the image component above the IF frequency. On the other hand, for a down-converting IF architecture, the RF signal is located above the IF frequency, and so, a high-pass filter 207 is used to remove the image component below the IF frequency.

The filtered RF signal at the output of the filter 207 is mixed by a mixer 209 with a local oscillator signal output from the local oscillator 211 to frequency shift the filter RF signal to the IF frequency. The oscillator frequency of the oscillator 211 is set to be the difference between the IF frequency and the RF signal frequency. As shown in the frequency diagram 223, the RF signal is frequency-translated to center at the IF frequency at the mixer 209 output.

The frequency-translated RF signal, which is now located at the IF frequency, is bandpass-sampled by the QBS-ADD 213 based on the in-phase sampling clock I-CLK and the quadrature sampling clock Q-CLK, which are generated by the sampling clock generator 215. As discussed with respect to FIGS. 1A and 1B, the in-phase sampling clock I-CLK and the quadrature sampling clock Q-CLK are separated from each other by ninety degrees. The communicating in-phase and quadrature information embedded in the RF signal are demodulated to baseband by I-CLK and Q-CLK, respectively, and the corresponding digital I-OUT and Q-OUT signals are generated. The frequency diagram 225 illustrates the signal demodulation to baseband from the IF frequency by the QBS-ADD 213.

Unlike conventional RF receivers, where the in-phase and quadrature demodulated signals are digitized by a pair of A/Ds at high-resolution and low sampling rate, the QBPS-ADD 213 in FIG. 2A is a delta-sigma type converter, which produces a stream of bi-level digital I-OUT and Q-OUT signals clocked at a sample rate equal to the IF frequency. The frequency diagram 227 illustrates the spectrum profile of typical I-OUT and Q-OUT signals. Even though the QBS-ADD has 1-bit resolution, the quantization noise is pushed out of the signal band yielding high-resolution I-OUT and Q-OUT signals.

Figure 3:
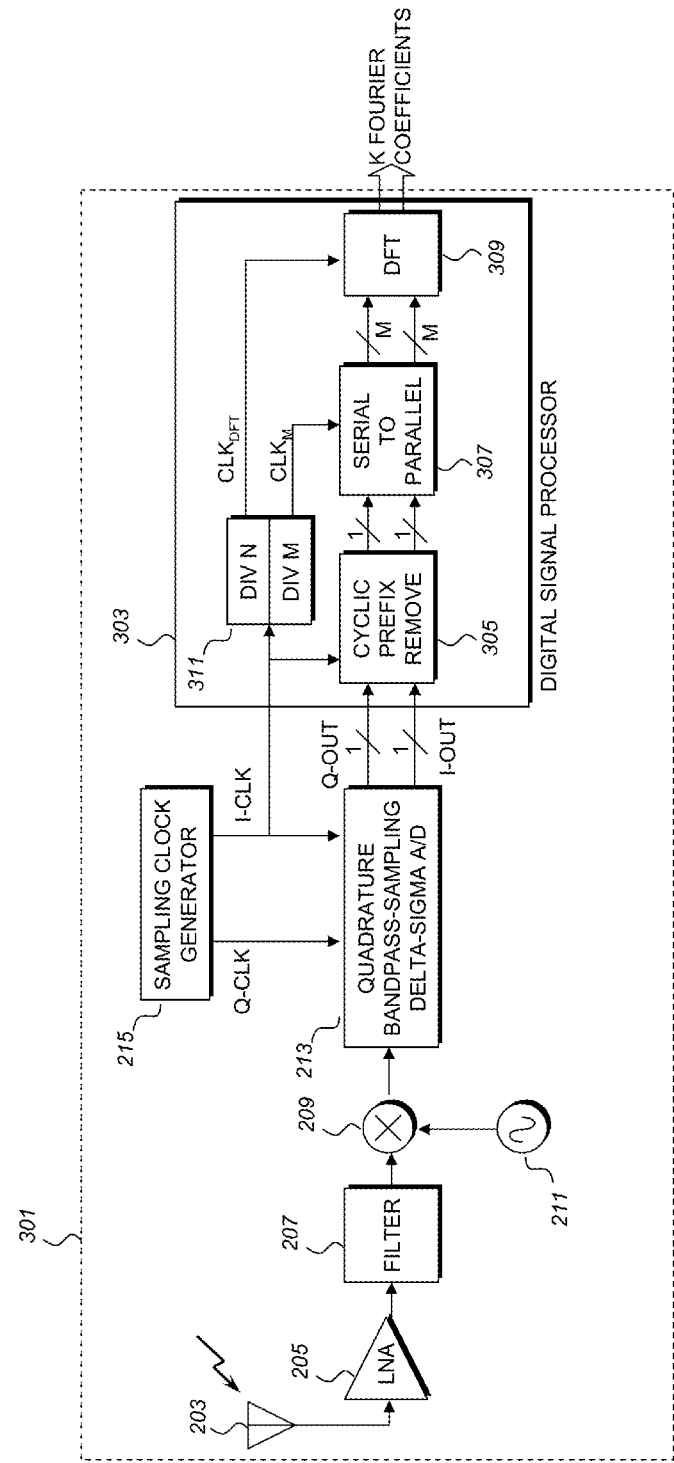
FIG. 3 is a schematic diagram illustrating an exemplary bandpass-sampling receiver architecture for OFMD, according to disclosed embodiments.

Referring now to FIG. 3, a schematic diagram illustrating an exemplary OFDM receiver 301 in accordance with one or more disclosed embodiments will be discussed and described. The OFDM receiver 301 comprises an antenna 203, an LNA 205, an image reject filter 207, a mixer 209, a local oscillator 211, a QBS-ADD 213, a sampling clock generator 215, and a digital signal processor (DSP) 303. The DSP comprises a cyclic prefix remove element 305, a serial-to-parallel converter 307, a clock divider 311, and a DFT processor 309.

The bi-level digital signals Q-OUT and I-OUT are serialized out of the QBS-ADD 213 at the clock rate of the in-phase sampling clock I-CLK, which is equal to the intermediate frequency. The cyclix-prefix remove element 305 is used to remove the cyclic prefixes in the OFDM symbol. In other words, contiguous sequences of the serial I-OUT and Q-OUT bit streams corresponding to the length of the cyclix prefix are periodically removed. Because conventional DSP processors cannot process data at a clock rate equal to the QBS-ADD 213 sampling rate (i.e., the clock rate of the in-phase sampling clock I-CLK), the serial-to-parallel converter 307 is needed to stream M-bits of I-OUT and Q-OUT in parallel at a reduced data rate of a reduced clock $CLK_M$, where $CLK_M$ is formed by dividing the in-phase sampling clock I-CLK by M (where M is an integer greater than 1).

In the OFDM receiver, the DFT processor 309 transforms demodulated signals in the time domain to sub-carriers in the frequency domain, which carry the transmitted data. For example, the $4^{th}$ generation long term evolution (4G LTE) wireless standard specifies flexible data bandwidths from 1.25 MHz, which encompasses 128 sub-carriers, up to 20 MHz, which encompasses 2048 sub-carriers. Regardless of the data bandwidths, the basic sub-carrier spacing is always 15 kHz. In order to correctly capture the all the OFDM sub-carriers from a given data bandwidth from the DFT processor 309, the bit-stream rate of signals Q-OUT and I-OUT at the output of the QBS-ADD 213 must be an integer multiple of the sub-carrier spacing. Since the QBS-ADD 213 samples at the IF frequency, the above requirement dictates the selection of the IF frequency to be an integer multiple of the received OFDM sub-carrier spacing.

In the forthcoming embodiments, it is assumed that a data bandwidth is already specified; and therefore, the total number of OFDM sub-carriers, denoted by K, is known to the quadrature bandpass sampling OFDM receiver in the disclosed embodiments.

The ratio between the high sampling rate of the QBS-ADD 213 and the OFDM sub-carrier spacing, denoted by N, could be on the order of $10^5$. The Fast Fourier Transform (FFT) would require N samples of signals I-OUT and Q-OUT to generate N complex Fourier coefficients. Using the FFT is therefore inefficient, since only a low number of FFT coefficients, equal to the number of OFDM sub-carriers are needed. The discrete Fourier transform (DFT), which renders a discrete finite sequence of complex coefficients, is given by:

$$X_k = \sum_{n=0}^{N-1} (I_n \pm jQ_n)e^{-j2\pi \cdot n \cdot k/N}, k = 0, 1, \ldots, K-1 \quad (1)$$

where N denotes the total number of sampled signals Q-OUT and I-OUT, K denotes the number of OFDM sub-carriers, $I_n$ and $Q_n$ denote the bit stream I-OUT and Q-OUT, respectively, and k denotes the OFDM sub-carrier position ranging from the first sub-carrier (k=0) to the $K^{th}$ sub-carrier (k=K−1). If $I_n+jQ_n$ is used in the formula, the in-phase complex coefficients are obtained, whereas the quadrature complex coefficients are generated if $I_n-jQ_n$ is used. Since $I_n$ and $Q_n$ are bi-level digital signals having values of 1 or −1, the above DFT formula can be rearranged so that no multiplication is required. Namely, the in-phase complex coefficients, $XI_k$, are given by $$IX_k = \sum_{n=0}^{N-1} (I_n A(k,n) + Q_n B(k,n)) - j(I_n B(k,n) - Q_n A(k,n)), \quad (2)$$

and the quadrature complex coefficients, $XQ_k$, are given by $$QX_k = \sum_{n=0}^{N-1} (I_n A(k,n) - Q_n B(k,n)) - j(I_n B(k,n) + Q_n A(k,n)) \quad (3)$$

when $$A(k,n) = \cos\left(\frac{2\pi \cdot n \cdot k}{N}\right)$$

and $$B(k,n) = \sin\left(\frac{2\pi \cdot n \cdot k}{N}\right).$$

Implementation of the above DFT formulas can be seen as adding or subtracting the instantaneous values of A(k,n) and B(k,n) to an accumulator N times depending on the signs of $I_n$ and $Q_n$.

Figure 4:
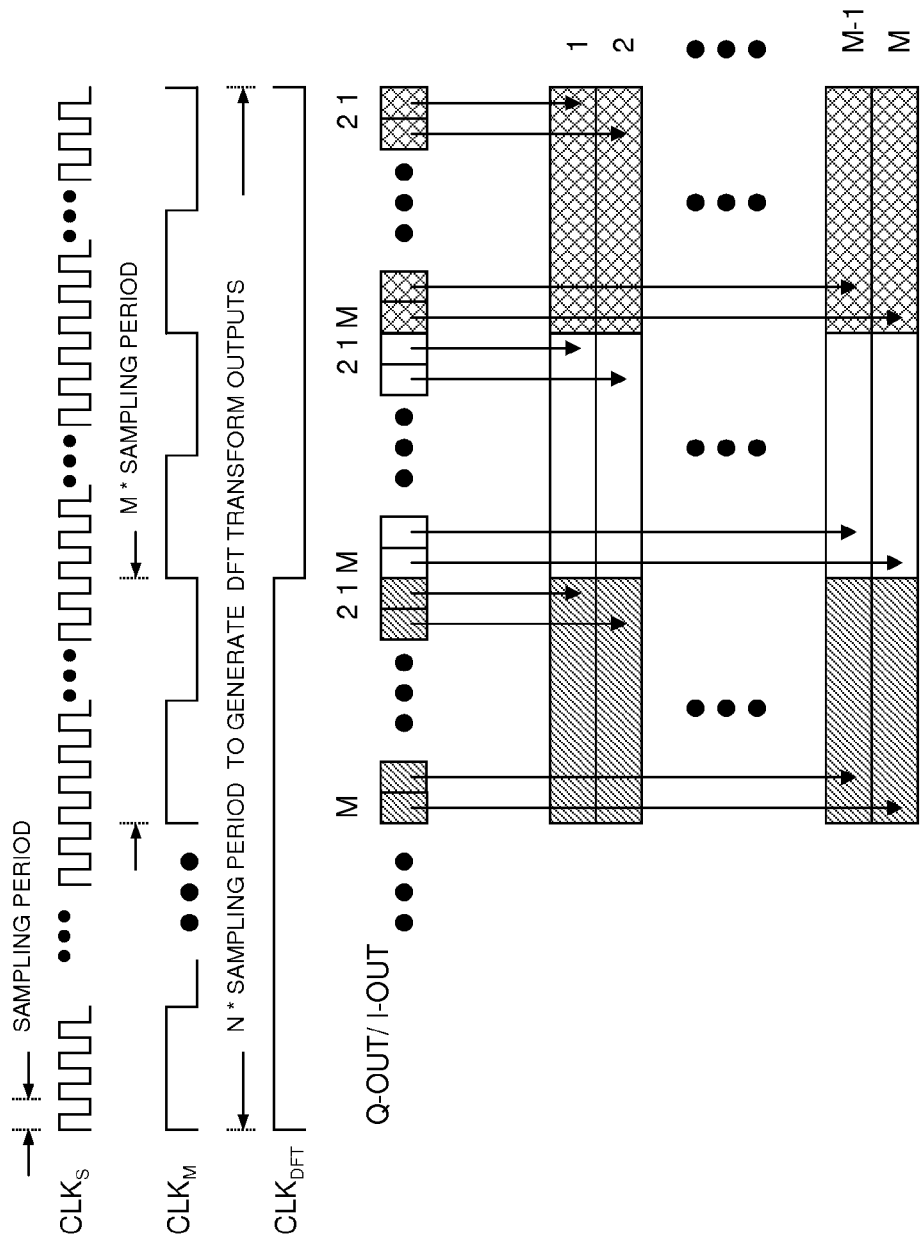
FIG. 4 is a timing diagram illustrating serial-to-parallel conversion of the quadrature bandpass-sampling delta-sigma analog-to-digital demodulator output bit streams, according to disclosed embodiments.

FIG. 4 illustrates how the serial I-OUT and Q-OUT bit streams clocked at the rate of the in-phase sampling clock I-CLK are converted into M parallel bits clocked at the reduced-rate of the reduced clock $CLK_M$, which is equal to the I-CLK frequency divided by M. A DFT clock $CLK_{DFT}$, which is equal to the I-CLK frequency divided by N, has a period comprising N samples of I-OUT and Q-OUT, which is the same as the period of an OFDM sub-carrier spacing. For example, for the 4G LTE wireless standard, this period is equal to $$\frac{1}{15 \text{ kHz}}.$$

The DFT clock $CLK_{DFT}$ is used to output the in-phase and quadrature complex Fourier coefficients generated from the DFT processor 309. The purpose of the de-serialization to a parallel M-bit I-OUT and Q-OUT is to reduce the clock rate, allowing conventional DSP processors to have enough time to perform fixed-point addition and subtraction. Equations (2) and (3) above can then be rearranged as follows:

$$IX_k = \sum_{n=0}^{\frac{N}{M}-1} \sum_{m=0}^{M-1} (I_p A(k,p) + Q_p B(k,p)) - j(I_p B(k,p) - Q_p A(k,p)), \quad (4)$$

$$QX_k = \sum_{n=0}^{\frac{N}{M}-1} \sum_{m=0}^{M-1} (I_p A(k,p) - Q_p B(k,p)) - j(I_p B(k,p) + Q_p A(k,p)) \quad (5)$$

where $p=nM+m$.

Figure 5:
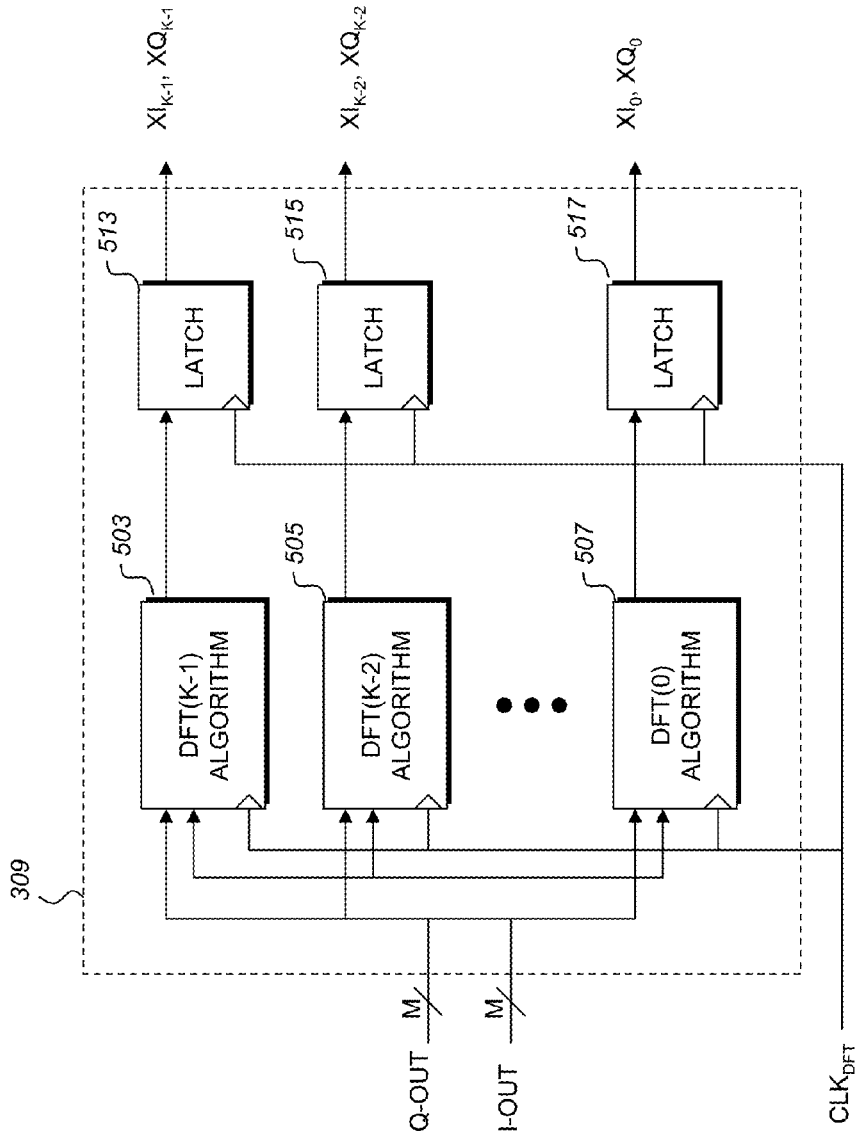
FIG. 5 is a schematic diagram illustrating an exemplary Fourier coefficient processor, according to disclosed embodiments.

FIG. 5 illustrates an exemplary DFT processor 309, which comprises a plurality of sub-DFT processors 503, 505, 507 used to compute the K Fourier coefficients, each of which corresponds to an OFDM sub-carrier, and a plurality of latches 513, 515, and 517. N total I-OUT samples and N total Q-OUT samples are required to compute the Fourier coefficients, where N is an integer that is equal to the IF frequency divided by the OFDM sub-carrier spacing. Normally, N should be in the order of $10^5$. Because of the serial-to-parallel conversion 307 in FIG. 3 into the parallel M bits, M should be a sub-multiple of N. The M parallel bits of I-OUT and Q-OUT are fed to the DFT blocks 503, 505 and 507 at the clock rate of the reduced clock $CLK_M$. During this period, all of the K in-phase and quadrature Fourier coefficients are updated in parallel according to equations (4) and (5) above. When the last set of M bits of I-OUT and Q-OUT in the N-length sample set are evaluated, the latches 513, 515 and 517 are clocked by the DFT clock $CLK_{DFT}$ to update the final K in-phase and quadrature complex Fourier coefficients, $XI_0 \ldots _{K-1}$ and $XQ_0 \ldots _{K-1}$, respectively.

Figure 6:
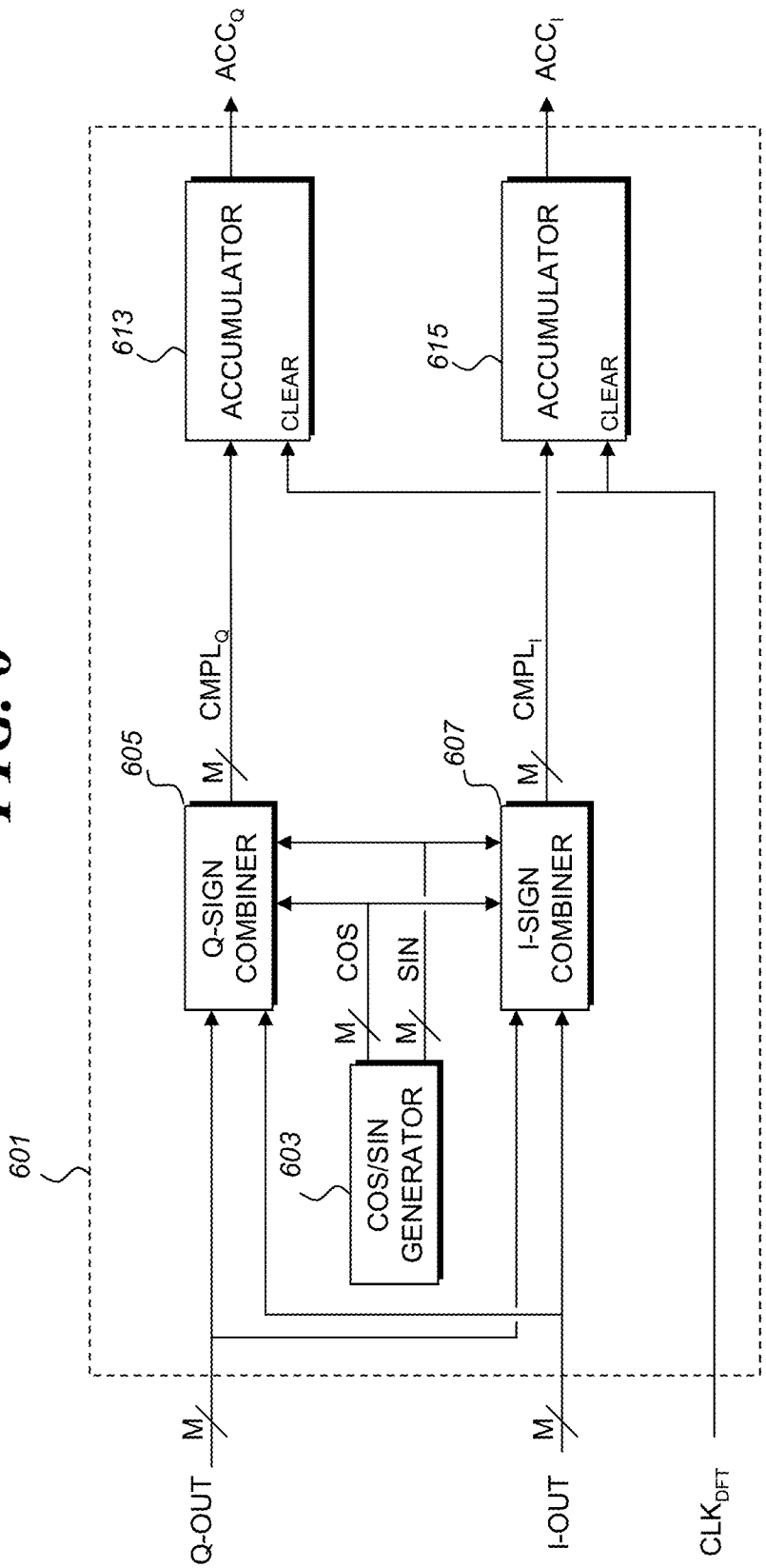
FIG. 6 is a schematic diagram illustrating an exemplary discrete Fourier transform processor, according to disclosed embodiments.

FIG. 6 illustrates an exemplary sub-DFT processor 601, which corresponds to the sub-DFT processors 503, 505, and 507 in FIG. 5. The sub-DFT processor 601 comprises a COS/SIN generator 603, a quadrature sign combiners 605, an in-phase sign combiner 607, and two accumulators 613, 615. The quadrature sign combiner 605 and the accumulator 613 are used to calculate the quadrature Fourier coefficient, while the in-phase sign combiner 607, and the accumulator 615 are used to calculate the in-phase Fourier coefficient.

At each step n, as n increments from 0 to $$\frac{N}{M} - 1,$$

the quadrature sign combiner 605 calculates the term $(I_p A(k,p) - Q_p B(k,p)) - j(I_p B(k,p) + Q_p A(k,p))$ in equation (5) above, while the in-phase sign combiner 607 calculates the term $(I_p A(k,p) - Q_p B(k,p)) - j(I_p B(k,p) + Q_p A(k,p))$ in equation (4) above. Note that $I_p$ corresponding to the bi-level signal I-OUT, has a value of $-1$ or 1. Likewise, $Q_p$ corresponding to the bi-level signal Q-OUT, has also a value of $-1$ or 1. Therefore, no multiplication is required, and both quadrature sign combiners 605 and the in-phase sign combiner 607 look up the signs of $I_p$ and $Q_p$ according to equations (5) and (4), respectively, and arrange the terms $A(k,p)$ and $B(k,p)$ into complex outputs $CMPL_Q$ and $CMPL_I$, respectively. The COS/SIN generator 603 generates the twiddle factors $$A(k, nM+m) = \cos\left(\frac{2\pi(nM+m)k}{N}\right)$$

and $$B(k, nM+m) = \sin\left(\frac{2\pi(nM+m)k}{N}\right)$$

for the quadrature and in-phase sign combiners 605, 607. Since there are M values I-OUT and Q-OUT, the COS/SIN generator 603 must generate M values of $A(k,nM+m)$ and M values of $B(k,nM+m)$ (m from 0 to M−1) at each step n for the quadrature sign combiner 605 to produce M complex values $CMPL_Q$ and the in-phase sign combiner 607 to produce M complex values $CMPL_I$.

The accumulator 613 adds all the M complex values $CMPL_Q$ to its current value to produce an updated accumulator complex value $ACC_Q$. Likewise, the accumulator 615 adds all the M complex values $CMPL_I$ to its current value to produce an updated accumulator complex value $ACC_I$. The process repeats for the next set of M samples of I-OUT and Q-OUT as the index n is incremented in equations (4) and (5) above, and when the last set of M samples of I-OUT and Q-OUT in the N-length sample set are evaluated, the instantaneous value of $ACC_I$ and $ACC_Q$ are captured by the latches 513, 515 and 517 in FIG. 5, and the clock $CLK_{DFT}$ resets the values of the accumulators 613 and 615 to zero.

It should be noted that the term communication unit may be used herein to denote a wired device, for example a high speed modem, an xDSL type modem, a fiber optic transmission device, and the like, and a wireless device, and typically a wireless device that may be used with a public network, for example in accordance with a service agreement, or within a private network such as an enterprise network or an ad hoc network. Examples of such communication devices include a cellular handset or device, television apparatus, personal digital assistants, personal assignment pads, and personal computers equipped for wireless operation, and the like, or equivalents thereof, provided such devices are arranged and constructed for operation in connection with wired or wireless communication.

The communication units of particular interest are those providing or facilitating voice communications services or data or messaging services normally referred to as ultra wideband networks, cellular wide area networks (WANs), such as conventional two way systems and devices, various cellular phone systems including analog and digital cellular, CDMA (code division multiple access) and variants thereof, GSM (Global System for Mobile Communications), GPRS (General Packet Radio System), 2.5G and 3G systems such as UMTS (Universal Mobile Telecommunication Service) systems, Internet Protocol (IP) Wireless Wide Area Networks like 802.16, 802.20 or Flarion, integrated digital enhanced networks, LTE (Long Term Evolution) networks, and variants or evolutions thereof.

Furthermore, the wireless communication devices of interest may have short range wireless communications capability normally referred to as WLAN (wireless local area network) capabilities, such as IEEE 802.11, Bluetooth, WPAN (wireless personal area network) or Hyper-Lan and the like using, for example, CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication devices of interest may be connected to a LAN using protocols such as TCP/IP, UDP/UP, IPX/SPX, or Net BIOS via a hardwired interface such as a cable and/or a connector.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A circuit for receiving an orthogonal frequency division multiplexing (OFDM) signal and generating a plurality of in-phase and quadrature complex Fourier coefficients comprising:
    an antenna configured to capture and produce an OFDM signal;
    a low noise amplifier (LNA) configured to receive the OFDM signal and generate an amplified OFDM signal;
    a filter configured to remove an OFDM image signal from the amplified OFDM signal to generate a filtered OFDM signal;
    a local oscillator configured to generate a local oscillator clock signal having a local oscillator frequency, the local oscillator clock frequency being equal to a difference between an intermediate frequency and an OFDM frequency of the OFDM signal;
    a mixer configured to frequency-shift the filtered OFDM signal to the intermediate frequency based on the local oscillator clock signal to generate a frequency-shifted OFDM signal;
    a sampling clock generator configured to
        generate an in-phase sampling clock signal having an in-phase sampling frequency,
        generate a quadrature sampling clock signal having a quadrature sampling frequency,
        the quadrature sampling clock signal being ninety degree out of phase with the in-phase sampling clock signal, the quadrature sampling frequency being equal to the in-phase sampling frequency;
    a quadrature bandpass-sampling delta-sigma analog-to-digital demodulator (QBS-ADD) configured to
        demodulate the frequency-shifted OFDM signal from the intermediated frequency down to baseband, based on the in-phase sampling clock signal, to generate an in-phase signal, and
        demodulate the frequency-shifted OFDM signal from the intermediated frequency down to baseband, based on the quadrature sampling clock signal, to generate a quadrature signal;
    a cyclic prefix removal circuit configured to
        receive the in-phase signal based on the in-phase sampling clock signal,
        receive the quadrature signal based on the in-phase sampling clock signal,
        generate a reduced in-phase signal based on the in-phase signal, and
        generate a reduced quadrature signal based on the quadrature signal;
    a clock divider configured to
        generate a divide-by-M clock signal having a divide-by-M frequency, based on the in-phase sampling clock signal, the divide-by-M frequency being equal to the in-phase sampling frequency divided by M, and
        generate a divide-by-N clock, having a divide-by-N frequency, based on the in-phase sampling clock signal, the divide-by-N clock frequency being equal to the in-phase sampling frequency divided by N;
    a serial-to-parallel converter configured to
        de-serialize the reduced in-phase signal based on the in-phase sampling clock signal to generate a set of M parallel in-phase bits at the divide-by-M frequency, and
        de-serialize the reduced quadrature signal based on the in-phase sampling clock to generate a set of M parallel quadrature bits at the divide-by-M frequency; and
    a plurality of discrete Fourier transform (DFT) circuits, each configured to receive the M in-phase bits and the M quadrature bits, and
    generate an in-phase complex Fourier coefficient and a quadrature complex Fourier coefficient based at the divide-by-N frequency.

2. The circuit of claim 1, wherein the discrete Fourier transform circuit comprises:
    a COS/SIN generator configured to generate
        first through $M^{th}$ first twiddle factors,
        first through $M^{th}$ second twiddle factors;
    a quadrature sign combiner configured to receive
        first through $M^{th}$ quadrature bits,
        first through $M^{th}$ in-phase bits,
        first through $M^{th}$ first twiddle factors, and
        first through $M^{th}$ second twiddle factors,
        to generate first through $M^{th}$ quadrature complex Fourier signals, the $i^{th}$ quadrature complex Fourier signal corresponding to a first combination of the $i^{th}$ first twiddle factor and the $i^{th}$ second twiddle factor based on the $i^{th}$ quadrature bit and the $i^{th}$ in-phase bit;
    an in-phase sign combiner configured to receive
        first through $M^{th}$ quadrature bits,
        first through $M^{th}$ in-phase bits,
        first through $M^{th}$ first twiddle factors,
        first through $M^{th}$ second twiddle factors,
        to generate first through $M^{th}$ in-phase complex Fourier signals, the $i^{th}$ in-phase complex Fourier signal corresponding to a second combination of the $i^{th}$ first twiddle factor and the $i^{th}$ second twiddle factor based on the $i^{th}$ quadrature bit and the $i^{th}$ in-phase bit;

a first accumulator configured to
    accumulate all M quadrature complex Fourier signals, and
    generate a quadrature complex Fourier coefficient based at the divide-by-N frequency;
a second accumulator configured to
    accumulate all M in-phase complex Fourier signals, and
    generate an in-phase complex Fourier coefficient based at the divide-by-N frequency;
wherein
    the first accumulator is reset to a zero value based at the divided-by-N frequency; and
the second accumulator is reset to a zero value based at the divided-by-N frequency.

3. The circuit of claim 1, wherein M is an integer between 2 and 100 and M is a sub-multiple of N.

4. The circuit of claim 1, wherein
N is a positive integer, and
N is equal to the intermediate frequency divided by the OFDM sub-carrier spacing.

5. The circuit of claim 1, wherein
a number of in-phase and quadrature complex Fourier coefficients is equal to a number of OFDM sub-carriers in the OFDM signal, and
the number of received OFDM sub-carriers is an order of magnitude to three orders of magnitude smaller than N.

6. A method for receiving an orthogonal frequency division multiplexing (OFDM) signal and generating a plurality of in-phase and quadrature complex Fourier coefficients comprising:
    receiving the OFDM signal through the air from the antenna;
    amplifying the OFDM signal to generate an amplified OFDM signal;
    filtering the amplified OFDM signal to remove an OFDM image signal from the amplified OFDM signal to generate a filtered OFDM signal;
    receiving a local oscillator clock signal having a local oscillator frequency, the local oscillator clock frequency being equal to a difference between an intermediate frequency and an OFDM frequency of the OFDM signal;
    mixing the filtered OFDM signal with the local oscillator clock signal to frequency-shift the filtered OFDM signal to an intermediate frequency to generate a frequency-shifted OFDM signal;
    generating an in-phase sampling clock having an in-phase sampling frequency;
    generating a quadrature sampling clock having a quadrature sampling frequency, the quadrature sampling clock being ninety degree out of phase with the in-phase sampling clock, the quadrature sampling frequency being equal to the in-phase sampling frequency;
    sampling the frequency-shifted OFDM signal using the in-phase sampling clock signal to generate a sampled in-phase signal that is down-converted to baseband;
    sampling the frequency-shifted OFDM signal using the quadrature sampling clock signal to generate a sampled quadrature signal that is down-converted to baseband;
    generating a divide-by-M clock signal, having a divide-by-M frequency, based on the in-phase sampling clock signal, the divide-by-M frequency being equal to the in-phase sampling frequency divided by M; and
    generating a divide-by-N clock signal, having a divide-by-N frequency, based on the in-phase sampling clock signal, the divide-by-N frequency being equal to the in-phase sampling frequency divided by N;
wherein
the operation of generating a plurality of in-phase complex Fourier coefficients and a plurality of quadrature complex Fourier coefficients comprises:
    generating a reduced in-phase signal by removing a cyclic prefix in the sampled in-phase signal based on the in-phase sampling clock signal;
    generating a reduced quadrature signal by removing a cyclic prefix in the sampled quadrature signal based on the in-phase sampling clock signal;
    generating an M-bit in-phase signal from the reduced in-phase signal based on the divide-by-M clock signal;
    generating an M-bit quadrature signal from the reduced quadrature signal based on the divide-by-M clock signal;
    generating the plurality of in-phase complex Fourier coefficients using the discrete Fourier transform on both the M-bit in-phase signal and the M-bit quadrature signal based on the divide-by-N clock signal; and
    generating a plurality of quadrature complex Fourier coefficients using the discrete Fourier transform on both the M-bit in-phase signal and the M-bit quadrature signal based on the divide-by-N clock signal.

7. The method of claim 6, wherein the operation of generating an in-phase complex Fourier coefficient and a quadrature complex Fourier coefficient using the discrete Fourier transform further comprises:
    generating first through $M^{th}$ first twiddle factors,
    generating first through $M^{th}$ second twiddle factors;
    receiving
        first through $M^{th}$ quadrature bits,
        first through $M^{th}$ in-phase bits,
        first through $M^{th}$ first twiddle factors, and
        first through $M^{th}$ second twiddle factors,
        to generate first through $M^{th}$ quadrature complex Fourier signals, the $i^{th}$ quadrature complex Fourier signal corresponding to a first combination of the $i^{th}$ first twiddle factor and the $i^{th}$ second twiddle factor based on the $i^{th}$ quadrature bit and the $i^{th}$ in-phase bit;
    receiving
        first through $M^{th}$ quadrature bits,
        first through $M^{th}$ in-phase bits,
        first through $M^{th}$ first twiddle factors,
        first through $M^{th}$ second twiddle factors,
        to generate first through $M^{th}$ in-phase complex Fourier signals, the $i^{th}$ in-phase complex Fourier signal corresponding to a second combination of the $i^{th}$ first twiddle factor and the $i^{th}$ second twiddle factor based on the $i^{th}$ quadrature bit and the $i^{th}$ in-phase bit;
    accumulating all M quadrature complex Fourier signals, and
    generating a quadrature complex Fourier coefficient based at the divide-by-N frequency;
    accumulating all M in-phase complex Fourier signals, and
    generating an in-phase complex Fourier coefficient based at the divide-by-N frequency;
wherein
    the value from the accumulating of all M quadrature complex Fourier signals is reset to zero based at the divided-by-N frequency; and
    the value from the accumulating of all M in-phase complex Fourier signals is reset to zero based at the divided-by-N frequency.

8. The method of claim 6, wherein
M is an integer between 2 and 100, and
M is a sub-multiple of N.

9. The method of claim 6 wherein

N is a positive integer, and

N is equal to the intermediate frequency divided by the OFDM sub-carrier spacing.

10. The method of claim 6 wherein a number of in-phase and quadrature complex Fourier coefficients is equal to a number of OFDM sub-carriers in the OFDM signal, and the number of received OFDM sub-carriers is an order of magnitude to three orders of magnitude smaller than N.

* * * * *